United States Patent [19]
de Vrieze

[11] 3,975,326

[45] Aug. 17, 1976

[54] PROCESS FOR THE ADDITION OF ADDITIVES TO THERMOPLASTICS

[75] Inventor: Christiaan G. de Vrieze, Schinnen, Netherlands

[73] Assignee: Stamicarbon B.V., Geleen, Netherlands

[22] Filed: Mar. 4, 1975

[21] Appl. No.: 555,274

[30] Foreign Application Priority Data
Mar. 5, 1974 Netherlands.................. 7402924

[52] U.S. Cl................. 260/23 H; 106/243; 106/285; 260/32.6 R; 260/32.6 A; 260/32.6 N; 260/33.6 PQ; 260/34.2

[51] Int. Cl.²............... C08K 5/01; C08K 5/20; C08L 91/00

[58] Field of Search........ 260/23 H, 33.6 PQ, 34.2, 260/32.6 A, 32.6 R, 32.6 N; 106/285, 243

[56] References Cited
UNITED STATES PATENTS

| | | |
|---|---|---|
| 2,770,609 | 11/1956 | Symonds............... 260/23 H |
| 3,231,592 | 1/1966 | McCord................... 106/243 |
| 3,294,532 | 12/1966 | Brunson et al........... 260/32.6 R |
| 3,390,800 | 7/1968 | Simons.................. 260/32.6 R |
| 3,594,342 | 7/1971 | Ratzsch et al........... 260/34.2 |
| 3,694,402 | 9/1972 | Essam................... 260/34.2 |
| 3,712,872 | 1/1973 | Lammers et al.......... 260/32.6 A |

*Primary Examiner*—Lewis T. Jacobs
*Assistant Examiner*—H. H. Fletcher
*Attorney, Agent, or Firm*—Cushman, Darby & Cushman

[57] ABSTRACT

In processes for processing thermoplastic resins which processes require mixing the thermoplastic resin with an additive consisting of a salt of an aliphatic carboxylic acid, the improvement of mixing the salt of the aliphatic carboxylic acid with (1) an amide of an aliphatic carboxylic acid of at least ten carbon atoms and (2) a mineral oil that is substantially non-volatile under the processing conditions, to facilitate addition of a measured amount of the additive and to prevent discoloration.

11 Claims, No Drawings

PROCESS FOR THE ADDITION OF ADDITIVES TO THERMOPLASTICS

The invention relates to a process for the addition of additives to thermoplastics, and in particular to thermoplastics which when produced are obtained as a solution or melt. The invention also relates to a composition used in combination with additives for thermoplastic resins.

Thermoplastics, e.g. polyolefins such as homopolymers and copolymers of ethylene, propylene, butene-1, 4-methyl pentene-1, etc. usually require the addition of additives, e.g. heat-stabilizers, antioxidants, UV-stabilizers, internal and external lubricants, antistatics, antiblocking agents, corrosion-inhibitors, and the like, during processing.

When thermoplastics, such as polyolefins, are prepared, they are often obtained as powders, which may be processed into granules. Additives may be mixed directly with the whole powdery plastics material or additives may be mixed with part of the plastic to form a master batch; the master batch is added to and mixed with the remaining thermoplastic material.

Solution polymerization of olefins to form normally solid polyolefins are known. Solution polymerization of ethylene, particularly to form high density polyethylene of a density of at least 0.94, is known. processes of this type have been described, e.g., in U.S. Pat. Nos. 2,862,917 and 3,491,073 and British patent specifications Nos. 1,235,062 and 1,251,177 which are incorporated herein by reference. From the solution of the polyalkene, particularly polyethylene, a polymer melt is recovered which is subsequently extruded, e.g. into granules. Most additives for the aforementioned thermoplastics are solid, although some liquid ones are known. The addition of measured amounts of additives that are solid at normal temperature to these types of thermoplastic resins presents difficulties.

Most additives can be dissolved. However, some additives, such as carbon black, metal carbonates and oxides, are insoluble. It would be possible to dissolve the soluble additives and to disperse insoluble additives, if any, in these solutions. Solutions or suspensions of this type could then be fed to the extruding device in which the polymer is processed into granules. In most cases however there is no solvent in which all additives will dissolve. It is then necessary to feed a number of solutions to the extruder. However, introducing one or more solvents to the extruder is objectionable. In order to extrude solvent containing material specially adapted, vented extruders, which are very expensive, must be used. The use of suspensions of additives has similar drawbacks because of the suspension agents used.

Many solid additives can be melted. The melting points usually range below 250°C. Such fusible additives may be added in measured amounts in the molten state, but such a technique appears to present several problems. The addition of these additives is effected gradually, and it is thus necessary to keep the additives in the molten state for some time. Although the composition of additives may contain inorganic components, the additives consist of organic or metal-organic components to a substantial extent. The temperatures at which the fusible components of these additives have fully melted vary widely. As the temperatures at which the additives melt increase, the possibility of discoloration of the mixture of additives becomes greater.

To restrict discolorations as much as possible, it is necessary to keep the temperature of the melt as low as possible, i.e. at or slightly over the melting point. Even then undesirable discoloration often occurs.

If the temperature of the composition of additives drops below the melting point, the molten mass sets fully or partly. In general, it is noted that a hard solid cake is formed. Local cooling can readily occur in feed pipes and valves. The formation of a hard solid cake will easily give rise to plugging of said feed pipes and valves.

SUMMARY OF THE INVENTION

The present invention is directed to overcoming the described problems of introducing solid additives into thermoplastic resins. In particular, the present invention is directed to overcoming the described problems of adding metal salts of carboxylic acids to melts of thermoplastic resins or to solution phase thermoplastic resins. Said metal salts contain a cation of Group I, II or III of the Periodic Table; said carboxylic acids contain at least 10 carbon atoms. The addition of said metal salts of carboxylic acids is effected using an amide of a carboxylic acid of at least 10 carbon atoms, and a mineral oil which is substantially non-volatile under the processing conditions of said addition of metal salts of carboxylic acids. The addition of metal salts of carboxylic acids into thermoplastic resins is effected by first forming a mixture of the described components, then heating the mixture to form a melt and finally adding the melt to a thermoplastic resin.

As disclosed in applicant's application, filed concurrently with this application, entitled: "Process for the addition of additives to thermoplastics" Ser. No. 555,273, filed Mar. 4, 1975, that is characterized in that the additives are mixed with a mineral oil that can be considered non-volatile under the usual processing conditions of the plastics material, this mixture is melted and added as a molten mass to the extruder in which the polymer melt is processed.

DETAILED DESCRIPTION OF THE INVENTION

It has been found that, if the additive composition for admixture with thermoplastic resins contains metal salts of aliphatic carboxylic acids with at least 10 C-atoms, wherein the metal cation of the salt is of a metal from Group I, II, or III of the Periodic Table, particularly of alkaline earth metals, such as magnesium and/or calcium, the addition of small amounts of mineral oils, as described in that copending application, does not give satisfactory results. If said metal salts, in particular calcium stearate, are heated with small amounts of mineral oil, the mixture will readily form a tough, highly viscous, inhomogeneous mass that is difficult to add in measured amounts. This can be improved partly, but not completely, by the use of larger amounts of oil. However, appreciably larger amounts of oil are less desirable in another respect: only at temperatures over the melting point of the said carboxylic salts, e.g. about 160°C for calcium stearate, can a properly flowing melt be obtained. Unfortunately, at those temperatures discoloration may occur.

A process for the addition to thermoplastics of solid additives, such as heat-stabilizers, antioxidants, UV-stabilizers, lubricants, antistatics, antiblocking agents, and corrosion-inhibitors, which include one or more metal salts of aliphatic carboxylic acids with at least 10 carbon atoms wherein said metal is of the Group I, II, or III of the Periodic Table, has now been found. The process is characterized by adding the mixture of the solid additives, which predominantly consist of substances that can be melted at temperatures of at most 250°C, in admixture with (1) an amide of an aliphatic carboxylic acid of at least 10 carbon atoms and (2) a mineral oil that can be considered non-volatile under the usual processing conditions of the plastics, and this mixture is added in the molten state to the dissolved or molten thermoplastic resin.

The addition of an amide of an aliphatic carboxylic acid with at least 10 carbon atoms gives a mixture that can easily be melted. By blending the additive metal salt of the carboxylic acid with the mineral oil and the amide the formation of a tough, highly viscous, inhomogeneous mass that cannot be measured or measured only with difficulty is obviated. Some examples of metal salts of carboxylic acids of at least 10 carbon atoms that can be incorporated in thermoplastics are the salts of sodium, potassium, magnesium, calcium, zinc, cadmium, and aluminum of saturated or unsaturated carboxylic acids, such as lauric acid, myristic acid, palmitic acid, stearic acid, arachidic acid, behenic acid, oleic acid, elaidic acid, erucic acid. The preferred salts are stearates which are conventionally used as additives to thermoplastics, of which calcium stearate is a common additive for a great variety of thermoplastics, such as vinyl-chloride polymers, polyesters, polyolefins, acrylonitrile-butadiene-styrene polymers.

Mixtures according to the invention that contain calcium stearate melt at temperatures considerably lower than the melting point of the calcium stearate (160°) to form a properly flowing melt that can easily be added in measured amounts to thermoplastics, e.g. in an extruding device in which the thermoplastics material is processed.

Some examples of carboxylic amides that are used in the present process are oleamide, stearamide, erucamide, behenamide, or mixtures of fatty acid amides, e.g. tallow amide, but also substituted amides, such as methylene bis-stearamide, ethylene bis-stearamide, and ethylene bis(hydroxystearamide).

The amount of carboxylic amide should be at least 10% by weight based on the weight of the salt of an aliphatic carboxylic acid. The amount of amide may be considerably larger than the amount of salt of an aliphatic carboxylic acid, but, for economic reasons, the excess is not usually large. Use is preferably made of 50 to 200% by weight of amide based on the weight of the salt of the carboxylic acid, and, more in particular, 80 to 120% by weight.

It has been found that addition of the carboxylic amide alone to the metal salt of the carboxylic acid does not give the desired result. A mixture of, e.g., calcium stearate and oleic acid amide can be cooled to temperatures below 160°C, i.e. the melting point of the calcium stearate, if it has fully melted, but once solid calcium stearate has separated off, it will have to be heated to about 160°C in order to obtain a completely molten mixture again.

The process according to the invention is particularly suitable for the addition of additives to thermoplastics that are obtained as melts or solutions in their preparation. Solutions are usually processed into a melt by removing the solvent, e.g. by evaporation.

A plastics melt is usually processed in an extruder, e.g. into granules. It is now possible to add the mixture of additives, which contains a mineral oil and the aforementioned amide and at least the greater part of which is in the molten state, to the dissolved or molten thermoplastic. By preference, measured amounts are fed to an extruder in which the thermoplastic is processed.

However, the present process is not restricted to the above application, but is also suitable for plastics that are obtained as powders, e.g. by polymerization in a vehicle which may be the monomer and in which the polymer does not dissolve, by polymerization in the gaseous phase, and the like. Powdery plastics of this type are often processed in an extruder. Addition of the additives to the plastics in the extruder has rarely been feasible because of the problems explained above. The additives are generally mixed into the powdery plastics material in the dry state. This requires the use of separate mixing devices. The present invention renders such mixing superfluous and, hence, presents an economical alternative to the prior art.

The mineral oils used preferably in the process according to the invention are the colourless or vitually colourless technical-grade white oils, which mainly consist of purified aliphatic hydrocarbons and which contain hardly any aromatics or unsaturated compounds. Such oils may be prepared by refining lubricating-oil fractions, e.g. by solvent-extraction followed by a treatment with oleum. Particularly suitable technical-grade white oils are the oils that are commercially available by the name of "Risella oil". By this trade name oils with various viscosities, which may range from about 45 to about 105 seconds Redwood No. 1 at 140°F (60°C), are put on the market. Kinematic viscosity conversion formulas for the viscosity scale Redwood No. 1 are disclosed in the "Chemical Engineers Handbook" Fifth Edition (McGraw-Hill chemical engineering series) p. 1-27 Table 1-9 (1974) which is incorporated by reference herein.

Of these oils, Risella 17 and Risella 29 with viscosities of about 45 and 70 seconds Redwood No. 1 at 140°F are very suitable. Also other technical-grade white oils with a corresponding viscosity can well be used. Generally white oils which are aliphatic hydrocarbons which are substantially free of aromatic compounds and unsaturated compounds with a viscosity scale ranging from about 45 to 105 seconds Redwood No. 1 at 140°F (60°C), preferably between 45 and 70 seconds Redwood No. 1 at 140°F, are employed. Because of the high temperatures of the polymer solutions or polymer melts, the boiling range of these oils should generally be over 250°C, at least the greater part of it. For low-melting additives, use may be made of oils with a lower boiling range, e.g. a boiling range which, at least for the greater part, is over 150°C. Because of the pressures used in extruders, such oils with a relatively low boiling range can yet be considered non-volatile at the processing temperatures in the extruder. Preference is given, however, to the oils with a higher boiling range as specified above. These white oils are very miscible with polyolefins.

Minor amounts of finely divided non-melting compounds may be incorporated in the mixture of additives. Naturally, when the mixture of additives, carboxylic amide and mineral oil is melted, in the presence of non-melting compounds, no fully melted mass will be obtained, but a melt in which the finely divided solid substances have been dispersed and which may be more or less pasty.

The mixtures according to the invention melt at a considerably lower temperature than the melting point of the particular fusible additives. This is of particular importance, because the salts of aliphatic carboxylic acids with alkali metals, alkaline-earth metals or earth metals generally melt at temperatures over 100°C. The calcium stearate which is often used melts at temperatures of 160 to 180°, depending upon the purity of the calcium stearate. Because considerably lower temperatures may be used during melting and maintaining the molten phase, discoloration problems hardly occur or not at all. Moreover, an important advantage is that a pasty mass is formed upon setting, e.g. by local cooling in a pipe. Such a pasty mass does not form an insurmountable obstacle for the still molten mass and can be pressed away by it. Blocking of conduits of polymer processing apparatus can thus be avoided.

If a molten mixture of additives without oil or amide of an aliphatic carboxylic acid sets in a conduit, the flow of molten additives through the conduit will readily cease, so that the stationary melt will solidify further in the conduit through heat losses and the conduit will become fully blocked up.

In polymerizations in which the polymer is obtained in solution, the molten additives, which may also contain a finely divided, non-melting additive, may be added to the polymer solution immediately after the polymerization. The molten mixture is preferably added to the molten polymer that has been freed of solvent.

It is particularly advantageous to effect the addition in an extruding device in which the polymer is processed, e.g. into granules.

In order to obtain the desired result, viz. a sufficient reduction of the melting point and a sufficiently pasty constitution of the molten melt, the amount of mineral oil should be at least 10% by weight of the total amount of additives to be mixed with it. In general, the amount of oil should not be so large that the final properties of the thermoplastics material will be affected appreciably. Hence, the amount by weight of oil will preferably not be larger than about three times the amount by weight of additives, and, more preferably, will be at most equal to it.

It is desirable to restrict the amount of oil particularly when a prospective use of the plastics material, processed, in accordance with the invention, is for packing foodstuffs. Under those circumstances the amount of organic products that can be extracted from the thermoplastics material should be as small as possible. The amount of oil will preferably not exceed 0.2 to 0.3% by weight based on the weight of plastics material. Under these conditions, the weight requirement of the additive amide-oil composition of the invention will then be fulfilled. However, if relatively large amounts of additives are used, it may be necessary to use more oil than the above-mentioned 0.2 to 0.3% based on the weight of plastics material.

The usual stabilizers may be included in the additive composition. These may give the polymer a better resistance to heat and/or oxidation. A sharp distinction between heat stabilizers and antioxidants is not always possible.

Use may, for instance, be made of: hindered phenols, aromatic amines, thio-ether derivatives, dithiocarbamates, and other stabilizers known as such and commercially available, e.g. 2.6-di-tert.-butyl-p-cresol, 4.4'-butylidene-bis(6-tert. butyl-m-cresol), 4.4'-methylene-bis-(2.6-di-tert.butyl-phenol), octadecyl-3-(3.5-di-tert.butyl-4-hydroxphenyl) propionate; dilauryl thiodipropionate, distearyl thiodipropionate, aryl and alkyl N-substituted p-phenylene diames, zinc dialkyl dithiocarbamates. The UV stabilizers that are widely used are usually the derivatives of benzophenone or benzotriazole, for instance: 2-hydroxy-4-n-octyloxy-benzophenone, 2-hydroxy-4-dodecyloxybenzophenone, 5-chloro-2-(2'-hydroxy-3' .5'-di-tert.butyl-phenyl) benzotriazole, 2.2'-dihydroxy-4-n-octyloxybenzophenone.

Furthermore, internal and/or external lubricants are added in most cases. External lubricants are also referred to as release agents, slip agents, and antiblocking agents. They comprise widely varying compounds. An important group is formed by the higher carboxylic acids, i.e. carboxylic acids with at least 10 carbon atoms and the salts thereof, in particular the stearates of calcium, magnesium or the alkali metals, to the use of which this application relates.

It will be clear to the expert that this enumeration of additives is given only by way of illustration and may be far from complete and that the additives which may be used are in no way restricted by the enumeration above. A general survey of additives is given in "Encyclopedia of Polymer Science and Technology" under the headings: STABILIZATION, ANTI-OXYDANTS, ANTI-OZONANTS, ANTISTATICS, LUBRICANTS and ULTRAVIOLET RADIATION ABSORBERS, which are incorporated herein by reference.

The present invention will preferably be used in the preparation of polyolefins, in particular polyethylene obtained as a solution, but is not restricted to it. The invention can also profitably be used for other types of thermoplastics.

The intended additives, such as stabilizers, lubricants, antistatics, antiblocking agents, corrosion inhibitors, are generally added in small amounts. The amount of each additive does normally not exceed 1% by weight and is preferably at most 0.2% by weight, and, more in particular, 0.1% by weight. All percentages being based on the weight of thermoplastic resin. However, the amount of additives plays hardly any part for the process of the invention to be applied. The total amount of additives is of importance only to the amount of oil, which, if it is so large that the properties of the polymer are affected by it, may give adverse secondary effects.

Even then the present invention may of course be used, although the amounts will preferably be so chosen that no, or at most minor, adverse secondary effects will occur.

The invention will be elucidated by the following examples without being restricted by them.

EXAMPLE 1

Equal parts by weight of calcium stearate with a melting point of 170°C and Risella oil 17 were slowly heated with stirring. At about 120°C a very thick viscous mixture formed which could no more be stirred. At about 160°C a fully molten mixture was formed. When the temperature was lowered, a thick viscous mass, which could not be processed, was formed again.

EXAMPLE 2

Equal parts by weight of calcium stearate and oleamide with a melting point of 76°C were slowly heated. At about 130°C a fully homogeneous liquid mass formed. On cooling a paste is formed at about 70°C which becomes as hard as stone upon further cooling and causes conduits to be blocked. This hard mass does not melt until at 100°C or higher. For, if demixing occurs, i.e. calcium stearate is separated off, it is necessary to heat considerably over 100°C. In conduits calcium stearate that has separated off will form a hard cake which soon leads to plugging and does not disappear through heating until over 160°C.

EXAMPLE 3

Equal parts by weight of calcium stearate, oleamide and Risella oil 17 were heated to 80°C, when a homogeneous liquid mass was formed. At 65°C the mass could still be measured out. At temperatures below 65°C the mass was pasty, but could be pressed through conduits. When the temperature was lowered, the pasty mass became tougher and tougher. Hence, the temperature must preferably not drop to below 40°C, as the mass will then become so tough that it can no longer be pressed from conduits. Raising the temperature to values between 40° and 65°C will again render the mass so much more pliable that it can be pressed away.

EXAMPLE 4

Equal parts by weight of calcium stearate, Irganox 1076 (n-octadecyl-2(4-hydroxy-3.5-di-tertiary butylphenyl) propionate) and Risella oil 17 were mixed with heating. At temperatures of 100° to 150°C the mass is tough and viscous. Over 160°C the mass has fully melted. Upon cooling to below 160°C, a tough, viscous mass is again formed which causes conduits to be blocked up.

EXAMPLE 5

In accordance with Example 4, a mixture was prepared, to which oleamide was moreover added. The amount by weight of oleic acid amide was equal to that of the other components (the composition thus being 1 : 1 : 1 : 1). When the mixture was heated to 80°–130°C, a readily processible liquid mass was obtained which could still be measured out at 60°C. It was found that this mass did not cause obstructions in conduits and could easily be pressed away.

What is claimed is:

1. In a process for adding to a molten thermoplastic resin or to a solution of a thermoplastic resin solid additives including heat stabilizers, antioxidants, UV-stabilizers, lubricants, antistatic agents, antiblocking agents and corrosion-inhibitors and containing only minor amounts, if any, of finely divided non-melting compounds which additives comprise at least one metal salt of an aliphatic carboxylic acid of at least 10 carbon atoms, said metal being a metal of Group I, II or III of the Periodic Table, said metal salt having a melting point of up to 250°C, the improvement comprising mixing said metal salt of an aliphatic carboxylic acid of at least 10 carbon atoms containing additive composition with at least 10% by weight, based on the weight of said salt, and up to 200% based on said salt, of an amide of a carboxylic acid having at least 10 carbon atoms and a mineral oil which is substantially non-volatile under the process conditions, to form a mixture and heating the mixture to a molten state, at a temperature less than the melting point of said additive and subsequently adding said melt to a themoplastic which is molten or in solution wherein the amount of each additive is up to 1% by weight based on the weight of the thermoplastic resin, wherein the amount of said mineral oil is at least 10% by weight of the total amount of said additives and is up to three times the weight of said additives.

2. The process of claim 1, wherein said mineral oil is a colorless white oil which has a boiling range that exceed 250°C.

3. The process of claim 1, wherein the amount of mineral oil is at most equal to the weight of said additives.

4. The process of claim 1, wherein the amount by weight of mineral oil is at most 0.3% by weight, based on the thermoplastics material.

5. The process of claim 1, wherein said mineral oil has a viscosity of 45 to 105 seconds Redwood No. 1 at 140°F (60°C).

6. The process of claim 1, wherein the amount by weight of carboxylic acid amide with at least 10 carbon atoms is at least 10% by weight of the amount of salt of an aliphatic carboxylic acid with at least 10 carbon atoms.

7. The process of claim 6, wherein the amount of amide is 40 to 200% by weight based on the salt of the carboxylic acid.

8. The process of claim 7, wherein the amount of amide is 80 to 120% by weight based on the salt of the carboxylic acid.

9. The process of claim 1, wherein the thermoplastics material used is a polyolefin prepared in solution by low-pressure polymerization process.

10. The process of claim 9, wherein the polyolefin is polyethylene.

11. The process of claim 1, wherein said amide is present in an amount ranging from 50 to 200% by weight based on the weight of the salt of the carboxylic acid.

* * * * *